United States Patent [19]
Ellison

[11] 3,986,683
[45] Oct. 19, 1976

[54] JET TAB STEERABLE MISSILE

[75] Inventor: John R. Ellison, Redondo Beach, Calif.

[73] Assignee: The United States of America as represented by the Secretary of the Air Force, Washington, D.C.

[22] Filed: Mar. 27, 1974

[21] Appl. No.: 456,570

[52] U.S. Cl. .............................. 244/3.21; 244/3.22; 239/265.19
[51] Int. Cl.² ........................................ F42B 15/02
[58] Field of Search .................... 244/3.21, 3.22; 239/265.19

[56] References Cited
UNITED STATES PATENTS

| | | | |
|---|---|---|---|
| 2,692,475 | 10/1954 | Hull | 244/3.22 |
| 2,850,977 | 9/1958 | Pollak | 244/3.22 |
| 2,879,955 | 3/1959 | Zborowski | 244/3.22 |
| 2,969,017 | 1/1961 | Kershner | 244/3.21 |
| 3,188,958 | 6/1965 | Burke et al. | 244/3.21 |
| 3,205,820 | 9/1965 | McCorkle, Jr. et al. | 244/3.21 |
| 3,384,325 | 5/1968 | Hermann | 244/3.22 |

Primary Examiner—Verlin R. Pendegrass
Attorney, Agent, or Firm—Joseph E. Rusz; Jacob N. Erlich

[57] ABSTRACT

A jet tab steerable missile having a plurality of tab-shaped elements rotatably mounted on the rear portion of the missile adjacent the nozzle. The tab-shaped elements are capable of 360° rotary movement from a thrust vector control position into the air stream. In so doing the tab-shaped elements will provide post "burn out" side force generation, and therefore, extend range control of the missile.

4 Claims, 5 Drawing Figures

JET TAB STEERABLE MISSILE

BACKGROUND OF THE INVENTION

This invention relates generally to missiles, and, more particularly to missiles which are steerable under the influence of controlable jet tabs.

The primary function of guided missiles is to deliver a warhead to a specified target. The range of payloads may vary from that necessary to destroy a tank, aircraft or other missile to that necessary to destroy a major city and surrounding suburban area. A first consideration, after the type of target and payload size is determined, is the selection of a suitable propulsion means. Most missiles get off the ground by means of a rocket booster; the exceptions are those carried aloft by aircraft and released from an altitude. Many missiles utilize only rocket propulsion, and, in some instances, two or three stages. Since most tactical missiles have motor burn times of ten seconds or less, thrust vector controlled steering becomes ineffective at relatively short ranges. In addition, moveable wing aerodynamic control is extremely inefficient in operation.

SUMMARY OF THE INVENTION

The jet tab steerable missile of this invention overcomes the problem set forth hereinabove. By combining a jet tab thrust vector control system with a 360° capability rotary actuator to move the tab from the thrust vector control position out into the air stream the instant invention provides post burn out side force generation, and, therefore, extended range control. The actuators can be either electric motors or hydraulic with large rotation angles with simplicity favoring the electric system and high power output favoring the hydraulic. With the jet tabs being rotatable 360° about an axis located along the longitudinal axis of the missile, minimum power requirements are found to be necessary for control of the tabs. Utilization of the air stream interaction is also feasible during motor operation thereby providing greatly increased turning moments during initial maneuver after missile launch.

It is therefore an object of this invention to provide a 360° rotation capability actuator to rotate the jet tab from the thrust vector control position to an aerodynamic control position.

It is another object of this invention to provide a solid material to create adequate side force for controlling a tactical missile in an air stream.

It is still another object of this invention to provide a controllable jet tab which greatly increases missile turning capability during powered flight.

It is a further object of this invention to provide a steerable jet tab missile which is highly reliable in operation, extremely economical to produce and which utilizes conventional currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENT

Figure 1:
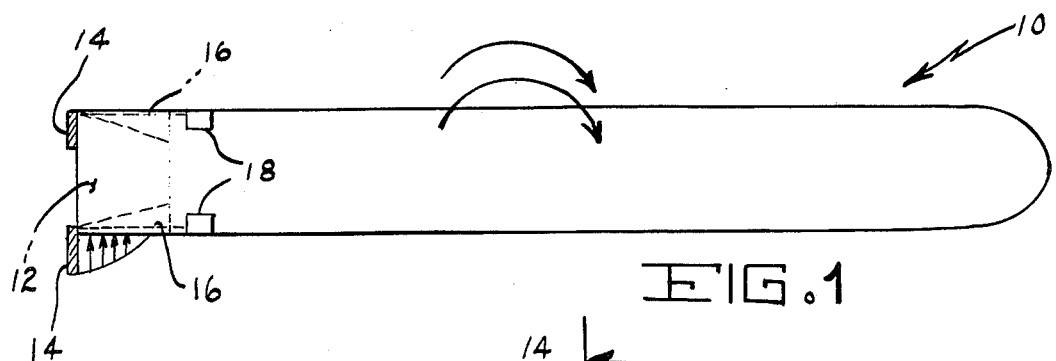
FIG. 1 is a side elevational view of the jet tab steerable missile of this invention shown partly in cross-section.

Reference is now made to FIG. 1 of the drawing which best shows the jet tab steerable missile 10 of this invention. Missile 10 is a conventional missile which basically falls within the air to air, surface to air, air to surface and surface to surface type.

At the rear of missile 10 is located the nozzle 12. Surrounding nozzle 12 and rotatably mounted on missile 10 along a plurality of axis which run parallel to the longitudinal axis of the missile are jet tabs 14. Any conventional actuator in the form of a rotatable shaft 16 may be operatively connected to jet tabs 14 for rotational movement thereof. In most cases the use of electrical, compressed air or pneumatic of hydraulic motors 18 which are connected to actuators of shafts 16. The amount of control is regulated by the rotation of actuator or shaft 16 which is in turn controlled by amplified stabilization or guidance signal voltages from the missiles.

In the instant invention the jet tabs 14 (as shown schematically in FIGS. 2 and 3) are positioned perpendicular to the longitudinal axis of the missile 10. Because of this arrangement the jet tabs are capable of complete 360° rotation. Such a rotation easily permits jet tab movement from the thrust vector control position shown in FIG. 2 to the aerodynamic control position shown in FIG. 3.

Figure 4:
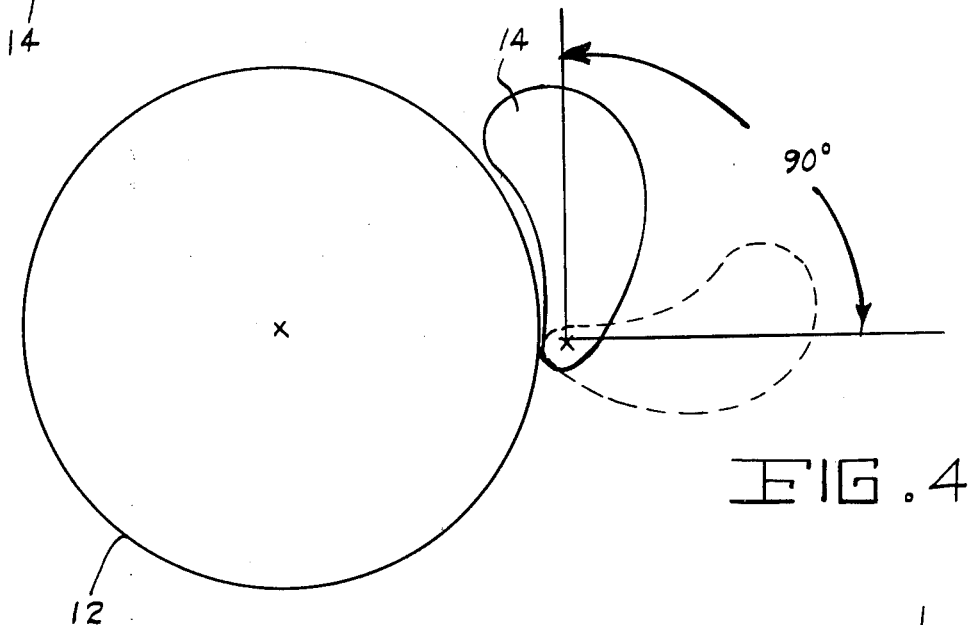
FIG. 4 is a schematic representation of a modified jet tab of the instant invention.
Figure 5:
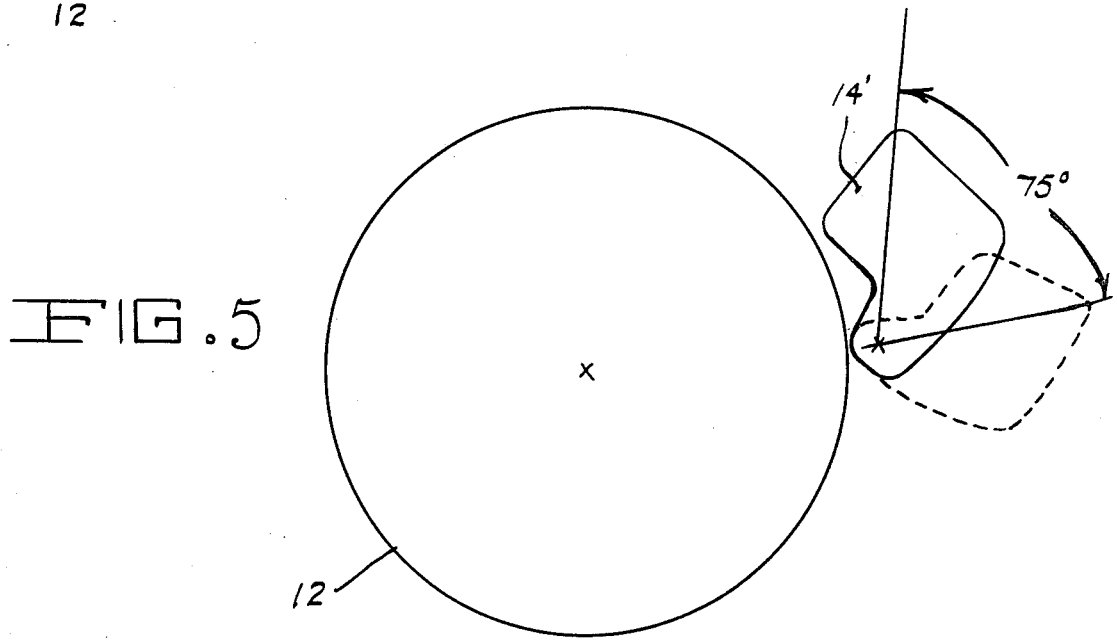
FIG. 5 is a schematic representation of another modified jet tab of the instant invention.
Figure 2:
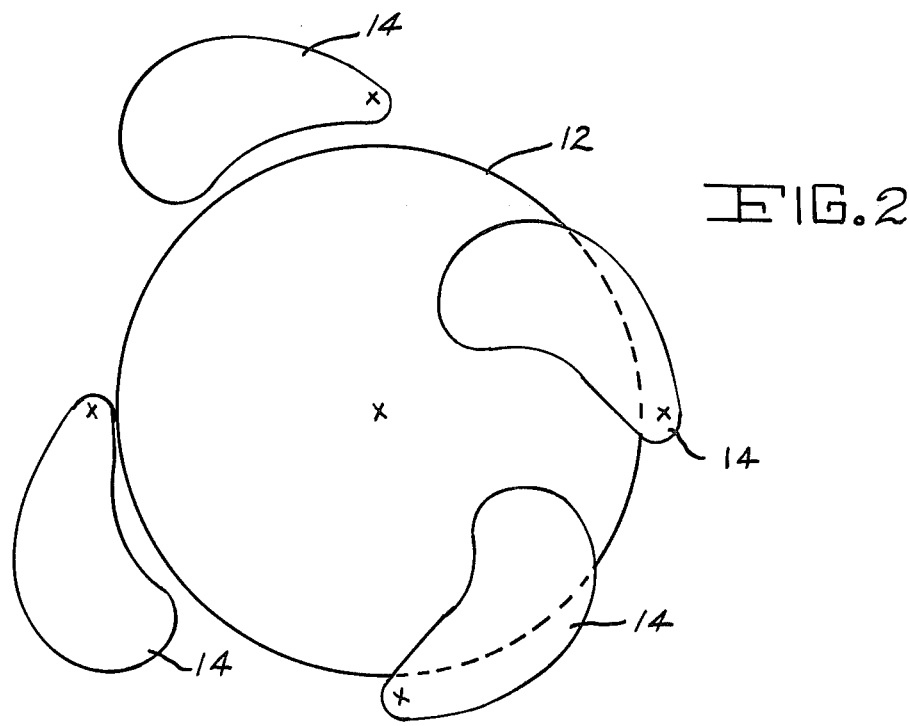
FIG. 2 is a schematic representation of the jet tabs of the instant invention shown during motor operation.
Figure 3:
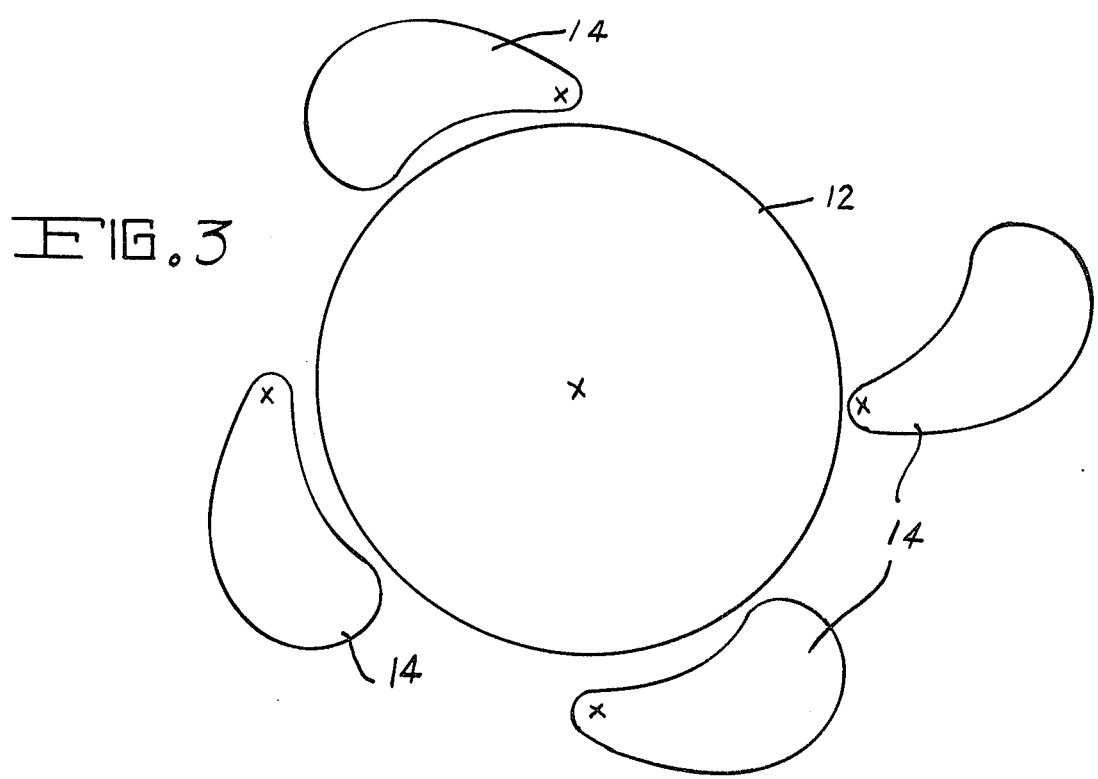
FIG. 3 is a schematic representation of the jet tabs of the instant invention shown after motor burn out.

The jet tabs 14 may take on a plurality of configurations. They may be of a curved shape as shown in FIGS. 2-4, having a concave curvature on the interior portion thereof and a convex curvation on the exterior. FIG. 5 discloses a substantially square or rectangular shaped jet tab 14' also being concave on the interior and convex on the exterior. These variations in shape enable various degrees of turning to have various effects on the movement of the missile 10. In FIG. 1, for example, displays a technique that would provide increased turning capability of missile 10 during powered flight. After "burn out" of the missile, rotation of the jet tabs 14 into a supersonic air stream will provide a post "burn out" side force generation, and, therefore extended range control of the missile.

Although this invention has been described with reference to particular embodiments it will be understood to those skilled in the art that this invention is also capable of a variety of alternate embodiments within the spirit and scope of the appended claims.

I claim:

1. A jet tab steerable missile comprising a missile body, a nozzle located at the rear of said body, a plurality of tab-shaped elements rotatably mounted on said body about respective axis parallel to the longitudinal axis of said missile adjacent said nozzle, said elements being capable of 360° of rotary motion about said axis and means operably connected to said elements for rotating said elements from a thrust control position within said nozzle to an aerodynamic control position external of said nozzle whereby said missile can be controlled even during the post "burn out" period of said missile.

2. A jet tab steerable missile as defined in claim 1 wherein said elements have a curved shape being of a concave configuration on the interior surface thereof and being of a convex configuration on the exterior surface thereof.

3. A jet tab steerable missile as defined in claim 1 wherein said elements have a substantially rectangular configuration.

4. A jet tab steerable missile as defined in claim 2 wherein said rotating means is in the form of a hydraulic actuating system.

* * * * *